US009956822B1

(12) United States Patent
Yu

(10) Patent No.: US 9,956,822 B1
(45) Date of Patent: May 1, 2018

(54) WHEEL ASSEMBLY FOR LUGGAGE

(71) Applicant: Olympia International, Inc., Torrance, CA (US)

(72) Inventor: Chris Yu, Torrance, CA (US)

(73) Assignee: Olympia International, Inc., Torrance, CA (US)

( * ) Notice: Subject to any disclaimer, the term of this patent is extended or adjusted under 35 U.S.C. 154(b) by 0 days. days.

(21) Appl. No.: 15/389,422

(22) Filed: Dec. 22, 2016

(51) Int. Cl.
*B60B 33/00* (2006.01)
*B60B 33/04* (2006.01)
*A45C 5/14* (2006.01)

(52) U.S. Cl.
CPC ........... *B60B 33/045* (2013.01); *A45C 5/14* (2013.01); *B60B 33/0002* (2013.01); *B60B 33/0028* (2013.01); *B60B 33/0042* (2013.01); *B60B 2200/45* (2013.01); *B60B 2900/212* (2013.01)

(58) Field of Classification Search
CPC ........... B60B 33/045; B60B 33/0042; B60B 33/0002; B60B 33/0028; B60B 2200/45; B60B 2900/212; B62B 2301/22; B62B 2301/20; B60G 11/22; B60G 11/225; B60G 2204/41; B60G 2300/084; B60G 7/04; A61G 2005/1078; A45C 5/04; Y10T 16/196; Y10T 16/212
See application file for complete search history.

(56) References Cited

U.S. PATENT DOCUMENTS 2,707,795 A * 5/1955 Skupas ................. B60B 33/045
16/44
2,738,542 A * 3/1956 Clark, Jr. ............. B60B 33/045
16/44
2,752,946 A * 7/1956 Towler .................... F16K 15/18
137/596.2
3,041,656 A * 7/1962 Goodall ............... B60B 33/045
16/31 R
6,357,077 B1 * 3/2002 Jones, Jr. ............. B60B 33/045
16/35 D
6,568,030 B1 * 5/2003 Watanabe ............ B60B 33/045
16/19
8,839,487 B2 * 9/2014 Plate .................... B60B 33/045
16/32
2004/0111830 A1 * 6/2004 Cooper ................ B60B 33/045
16/44
2007/0056140 A1 * 3/2007 Yamauchi ........... B60B 33/0007
16/18 B
2007/0143957 A1 * 6/2007 Baek .................... B60B 33/045
16/44

FOREIGN PATENT DOCUMENTS

CN      204232447 U  *  4/2015

* cited by examiner

Primary Examiner — Chuck Mah
(74) Attorney, Agent, or Firm — Lee, Hong, Degerman, Kang & Waimey

(57) ABSTRACT

A wheel assembly includes a first body having a first end portion and a second end portion; a second body having a third end portion and a fourth end portion, the third end portion of the second body rotatably coupled to the second end portion of the first body via a first pivot pin; a wheel rotatably coupled to the second body via a second pivot pin; a rod having a fifth end portion and a sixth end portion, the fifth end portion coupled with the first body via a third pivot pin; a first coiled spring having a first end contacting the first body and a second end contacting the third end portion; and a second coiled spring having a third end, the rod inserted into the second coiled spring via the third end, and a fourth end contacting the fourth end portion.

16 Claims, 4 Drawing Sheets

WHEEL ASSEMBLY FOR LUGGAGE

BACKGROUND OF THE INVENTION

Field

The present invention relates generally to a wheel assembly for luggage. More specifically, the present invention relates to luggage containers that have a shockproof wheel assembly.

Background

A challenge to traveling has always been carrying one's belongings in the most efficient and easy manner. To meet this challenge, luggage with wheels have appeared in the prior art to allow carrying luggage easily. However, prior art designs merely allow rolling luggage and wheels of the rolling luggage are prone to damage. Probably, wheels are most easily breakable parts of luggage. In particular, when the rolling luggage is heavy due to contents therein, the wheels are more prone to damage caused by impact from hard surfaces that are in contact with the wheels. Once wheels are damaged, luggage become unusable or the wheels need to be replaced. Therefore, a solution is necessary to avoid such inconvenience and to minimize impacts applied to wheels of the luggage.

SUMMARY OF THE INVENTION

Accordingly, the present invention is directed to an improved wheel assembly for luggage that substantially obviates one or more of the problems due to limitations and disadvantages of the related art. According to one embodiment of the present invention, a wheel assembly includes: a first body; a second body rotatably coupled with the first body such that an angle between the first body and the second body changes according to movement of the second body with respect to the first body; a wheel rotatably coupled to the second body; and a rod rotatably coupled with the first body such that the rod is movable with respect to the first body when the wheel assembly is not fully assembled, wherein: the wheel is coupled to the second body via a first pivot pin; the second body is coupled with the first body via a second pivot pin; and the rod is coupled with the first body via a third pivot pin.

According to another embodiment of the present invention, a wheel assembly includes: a first body having a first end portion and a second end portion; a second body having a third end portion and a fourth end portion, the third end portion of the second body rotatably coupled to the second end portion of the first body via a first pivot pin; a wheel rotatably coupled to the second body via a second pivot pin; a rod having a fifth end portion and a sixth end portion, the fifth end portion coupled with the first body via a third pivot pin; a first coiled spring having a first end contacting the first body and a second end contacting the third end portion of the second body; and a second coiled spring having a third end, the rod inserted into the second coiled spring via the third end, and a fourth end contacting the fourth end portion of the second body, wherein an angle between the first body and the second body changes according to movement of the second body with respect to the first body, the angle decreased when at least one of the first coiled spring or the second coiled spring is compressed.

According to yet another embodiment of the present invention, a luggage container includes: a wheel holder coupled to a side of the luggage container; and a wheel assembly coupled to the wheel holder, wherein the wheel assembly includes: a first body having a first end portion and a second end portion; a second body having a third end portion and a fourth end portion, the third end portion of the second body rotatably coupled to the second end portion of the first body via a first pivot pin; a wheel rotatably coupled to the second body via a second pivot pin; a rod having a fifth end portion and a sixth end portion, the fifth end portion coupled with the first body via a third pivot pin; a first coiled spring having a first end contacting the first body and a second end contacting the third end portion of the second body; and a second coiled spring having a third end, the rod inserted into the second coiled spring via the third end, and a fourth end contacting the fourth end portion of the second body, wherein an angle between the first body and the second body changes according to movement of the second body with respect to the first body, the angle decreased when at least one of the first coiled spring or the second coiled spring is compressed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings. Therefore, it is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF EMBODIMENTS

Figure 1:
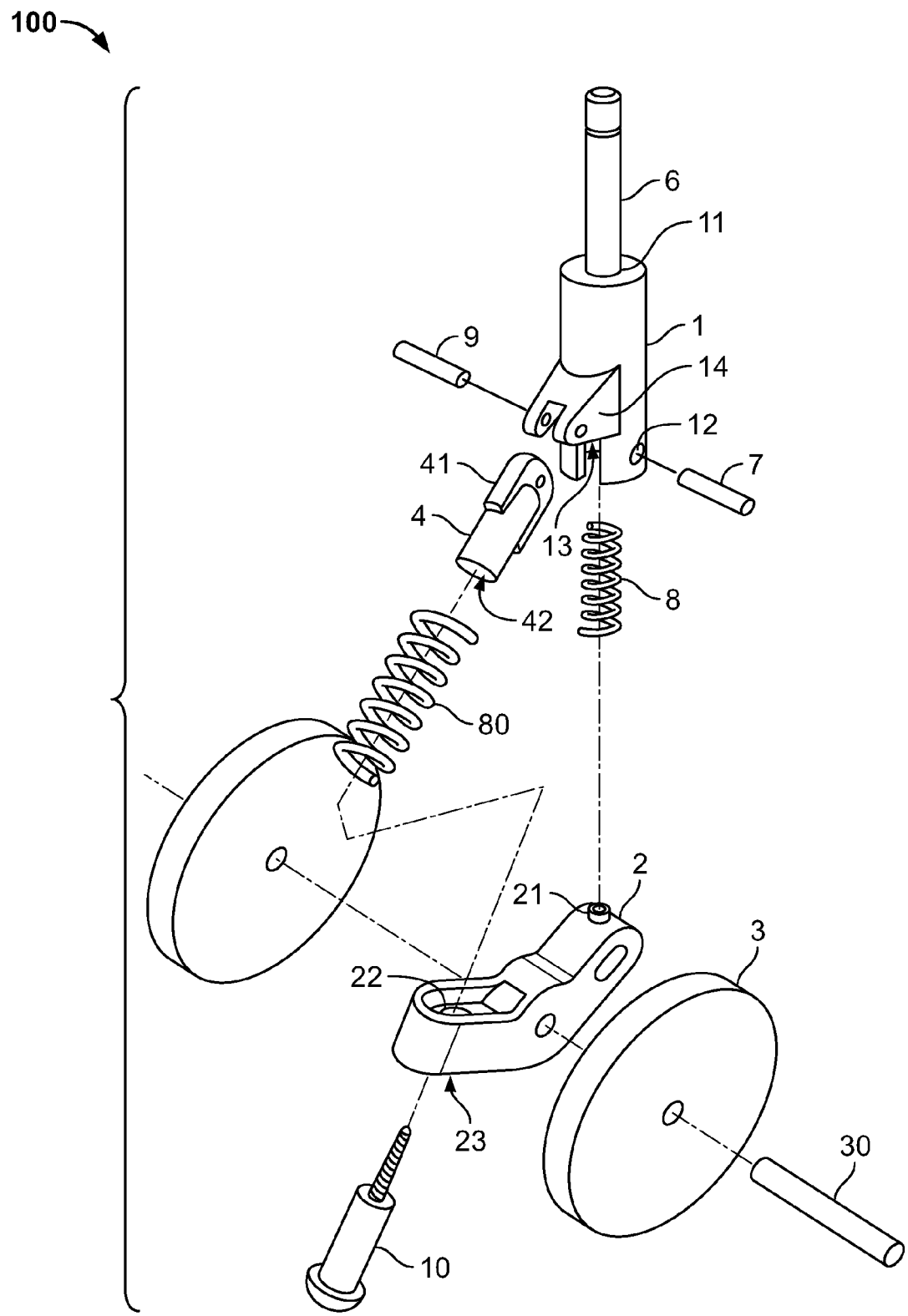
FIG. 1 is a perspective exploded view of a wheel assembly according to an embodiment of the present invention.
Figure 2:
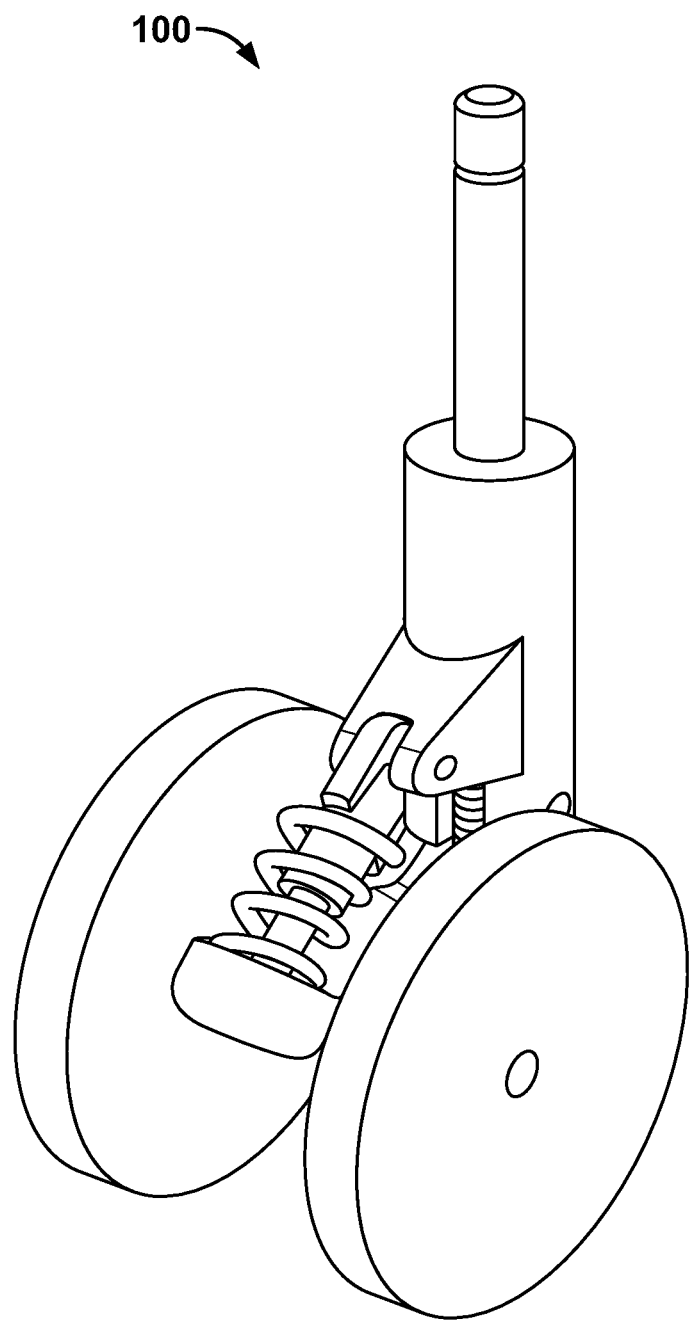
FIG. 2 is a perspective assembly view of a wheel assembly according to an embodiment of the present invention.
Figure 3:
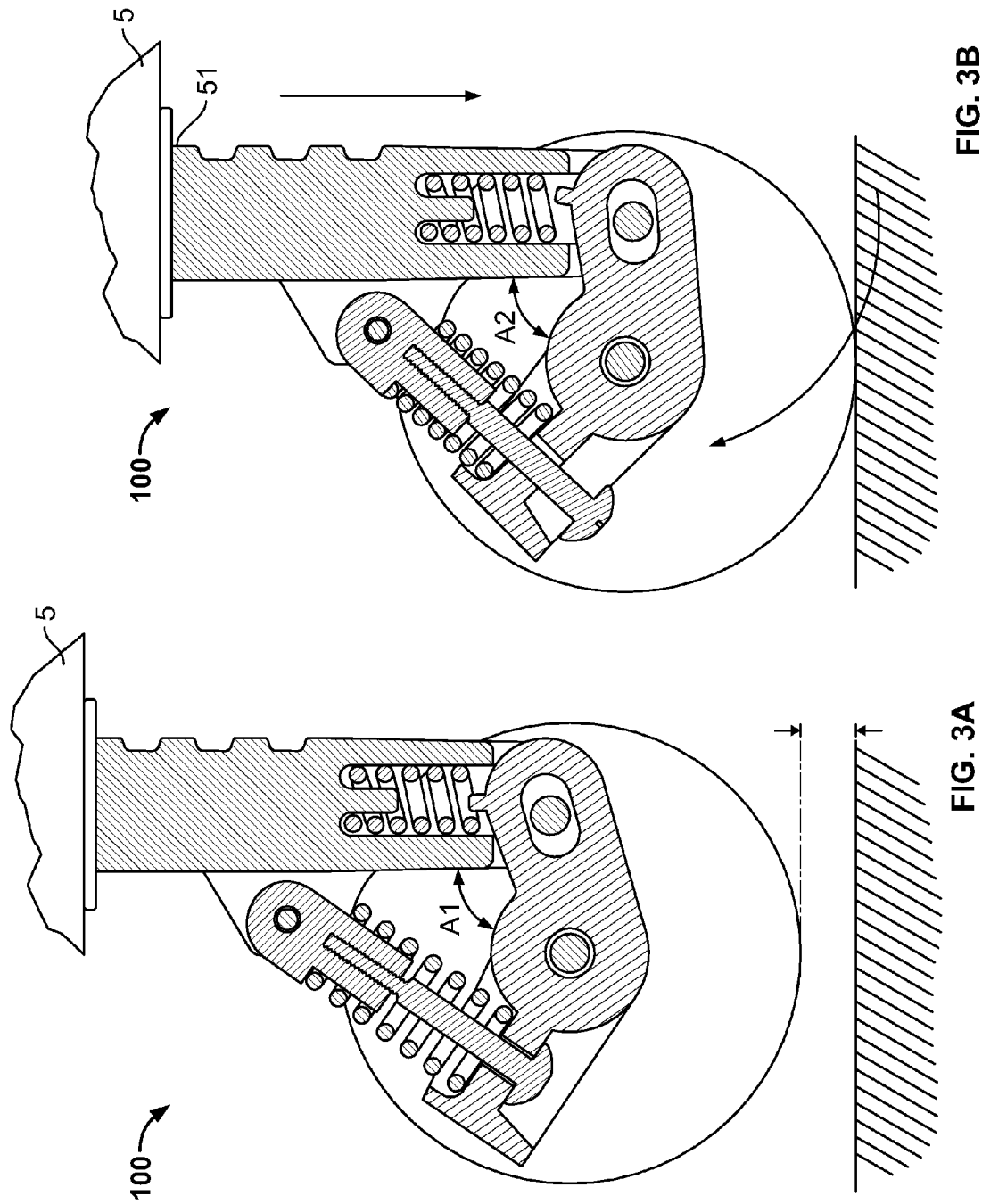
FIG. 3A and FIG. 3B are sectional views of FIG. 2.

Hereinafter, the present invention will be described with respect to the embodiment(s) illustrated in the annexed drawings.

Referring to FIGS. 1-3B, according to an embodiment of the present invention, a wheel assembly 100 includes a first body 1, a second body 2 coupled with the first body 1, a single wheel or a pair of wheels 3 rotatably coupled to the second body 2 via a first pivot pin 30, and a rod 4 coupled to the first body 1. In one embodiment, the wheel assembly 100 is coupled with a wheel holder 5 (shown in FIGS. 3A, 3B, and 4) that is configured to be fixed to a luggage container. A hole 11 is formed at a first end of the first body 1 and a connection rod 6 that passes through a hole 51 formed at the wheel holder 5 is inserted into the hole 11 such that the first body 1 is coupled with the wheel holder 5.

The first body 1 is divided into two separated first lugs 12 at a second end that is at an opposite side of the first end, the first lugs 12 extending from two side portions of the second end, such that a first end portion of the second body 2 is located between the first lugs 12. Each of the first lugs 12 has a hole or a through hole and a corresponding through hole is formed at the first end portion of the second body 2 such that a second pivot pin 7 fastens the first end portion of the second body 2, the second body 2 rotatable about the second pivot pin 7 when the wheel assembly 100 is not completely assembled. In one embodiment, the second pivot pin 7 may be a rivet.

A size of the holes or through holes of the first lugs 12 is smaller than a size of the corresponding through hole of the second body 2. For example, the holes or through holes of the first lugs 12 are circular and sized to fit the second pivot pin 7 therein. In contrast, the through hole of the second body 2 is shaped and sized such that the through hole of the second body 2 is movable with respect to the second pivot pin 7. For example, the through hole of the second body 2 may be sized such that two second pivot pins 7 may fit in the through hole while the holes or through holes of the first lugs 12 are sized to have only one second pivot pin 7 therein. Further, the shape of the through hole of the second body 2 may be oval or elongated circle.

A bottom of the second end of the first body 1 is recessed and a first protrusion 13 protrudes from the recessed area of the bottom. A second protrusion 21 that corresponds to the first protrusion 13 is formed at the first end portion of the second body 2. Preferably, the shape and size of the first protrusion 13 and the second protrusion 21 are same. When the wheel assembly 100 is assembled, the first protrusion 13 and the second protrusion 21 are aligned by rotation of the second body 2 about the second pivot pin 7 to receive a first coiled spring 8 such that the first protrusion 13 is inserted into a first end of the first coiled spring 8 and the second protrusion 21 is inserted into a second end of the first coiled spring 8. The first coiled spring 8 is elastic, and thus, is compressed when the second body 2 is moved toward the first body 1 such that the second pivot pin 7 initially located at a first position of the through hole of the second body 2 is relocated at a second position of the through hole of the second body 2 or when the wheels 3 are pressed against a hard surface of a floor or wall.

The first body 1 has two separated second lugs 14 extending from a portion of the first body 1 located between the first end and the second end of the first body 1. Each of the second lugs 14 has a hole or through hole. The rod 4 that has a through hole formed at a first end portion is located between the second lugs 14 such that the holes or through holes of the second lugs 14 are aligned with the through hole of the rod 4 to receive a third pivot pin 9 therethrough. For example, the third pivot pin 9 may be a rivet. When the wheel assembly 100 is not completely assembled, the rod 4 is rotatable about the third pivot pin 9. Two protrusions 41 are formed on the rod 4 at or near the first end portion of the rod 4, one protrusion 41 facing an opposite side of the other protrusion 41, and sizes of the two protrusions 41 being substantially same. When the wheel assembly 100 is assembled, the two protrusions 41 are located between the second lugs 14 at a certain angle of the rod 4 that is achieved according to rotation of the rod 4 about the third pivot pin 9. The rod 4 has a hole 42 formed at a second end portion to receive a fastening means 10 such as a screw.

The second body 2 has a receiving portion 22 formed at a second end portion. A through hole 23 is formed at the receiving portion 22. The receiving portion 22 is recessed with a rim formed as a boundary of the receiving portion 22. The receiving portion 22 is sized and shaped to receive a first end of a second coiled spring 80. The rod 4 is inserted into a second end of the second coiled spring 80 such that the second end of the second coiled spring 80 contacts the two protrusions 41. In one embodiment, both a length and a diameter of the second coiled spring 80 are greater than a length and a diameter of the first coiled spring 8. When the wheel assembly 1 is assembled, the first body 1 and the second body 2 should be positioned to set a proper angle between them to receive the second coiled spring 80, into which the rod 4 is inserted, is positioned at the receiving portion 22 of the second body 2.

In the assembled wheel assembly 100, the fastening means 10 passing through the through hole 23 is inserted into the hole 42 of the rod 4. In one embodiment, a portion of a stem of the fastening means 10 that is inserted into the hole 42 is exposed between the receiving portion 22 and the second end portion of the rod 4. Due to elasticity of the second coiled spring 80, the second coiled spring 80 is compressed when the second body 2 is moved toward the first body 1 due to weight or pressure applied to the wheel(s) 3 that contacts a hard surface of a floor or wall. Therefore, the angle between the first body 1 and the second body 2 may decrease when the second coiled spring 80 is compressed to absorb shocks.

According to one embodiment, in the assembled wheel assembly 100, the angle between the first body 1 and the second body 2 is about 90°. In another embodiment, the angle may be less than 90°. For example, with respect to the vertically positioned first body 1, the second body 2 is tilted upward such that the angle between them is less than 90°. For example, the angle between the first body 1 and the second body 2 may be between 30° and 80°. For another example, the angle between the first body 1 and the second body 2 may be 75°, 65°, 55°, or 40°. In the assembled wheel assembly 100, an angle between the first body 1 and the rod 4 is substantially maintained without any changes even when the angle between the first body 1 and the second body 2 is changed. The angle decreases from A1 to A2 when the wheel(s) 3 are pressed hard such that the second coiled spring 80 is compressed, as exemplified in FIG. 3A and FIG. 3B.

Figure 4:
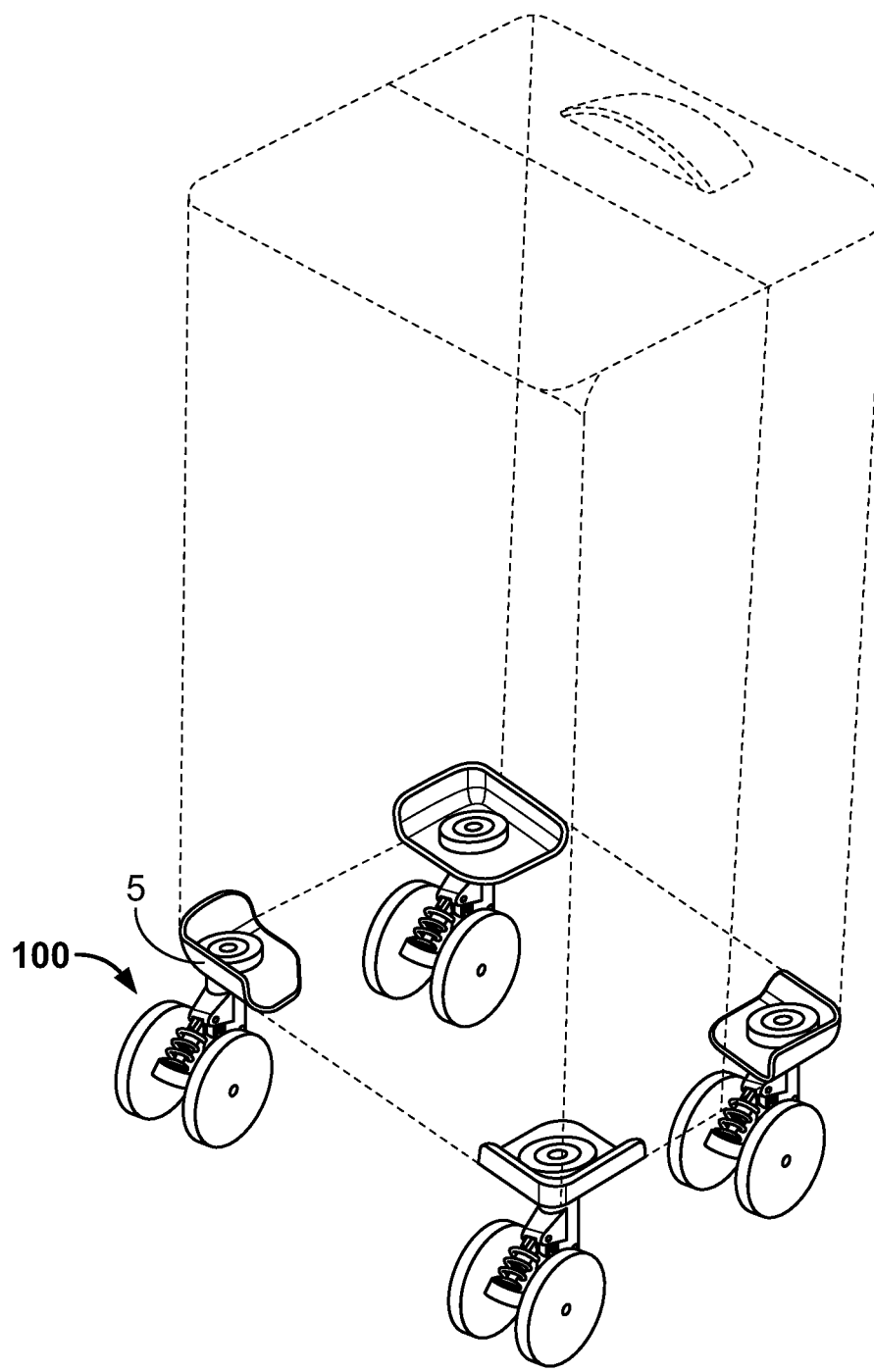
FIG. 4 is a schematic view illustrating a luggage container disposed on a wheel assembly according to an embodiment of the present invention.

Referring to FIG. 4, a luggage container disposed on a plurality of wheel assemblies according to an embodiment of the present invention can absorb shock. The luggage may have at least two wheel assemblies. As described above, by having two coiled springs 8 and 80 in each wheel assembly 100, shock can be absorbed effectively even when the luggage container is heavy. That is, the wheel assembly 100 can endure impact applied to the wheels 3 due to the coiled springs 8 and 80 that are compressed in response to the impact even when the heavy luggage container is handled roughly.

Those skilled in the art will appreciate that alternative embodiments exist from the above description of the embodiments without departing from the spirit and scope of the invention. The above described embodiments were shown in the context of a standard carry-on size luggage in the drawings. However, in alternative embodiments, a full size luggage or a luggage with additional compartments can be substituted for the described luggage. In addition, luggage may be made with any material that is suitable.

Therefore, the foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and examples provide a complete description of the manufacture and use of the composition of the invention. Since many embodiments of the invention can be made without departing from the spirit and scope of the invention, the invention resides in the claims hereinafter appended.

What is claimed is:

1. A wheel assembly comprising:
a first body having two separated lugs extending from a side of the first body, each of the lugs having a hole or through hole;
a second body rotatably coupled with the first body such that an angle between the first body and the second body changes according to movement of the second body with respect to the first body;
a wheel rotatably coupled to the second body; and
a rod rotatably coupled with the first body, the rod having a through hole formed at a first end portion that is located between the lugs, two protrusions formed at or near the first end portion of the rod, and the rod further having a hole formed at a second end portion to receive a fastening means,
wherein:
the wheel is coupled to the second body via a first pivot pin;
the second body is coupled with the first body via a second pivot pin;
the rod is coupled with the first body via a third pivot pin that passes through the holes or through holes of the lugs and the through hole of the rod;
the second body has a receiving portion formed at one end portion;
a through hole is formed at the receiving portion;
a first end of a first coiled spring is positioned at the receiving portion;
the rod is inserted into a second end of the first coiled spring such that the second end of the first coiled spring contacts the two protrusions;
the fastening means, passing through the through hole of the receiving portion of the second body and the first coiled spring, is inserted into the hole of the rod; and
a portion of the fastening means, which is located within the first coiled spring, is exposed between the hole of the rod and the through hole of the receiving portion the second body, allowing the portion of the fastening means to move up and down through the through hole of the receiving portion of the second body.

2. The wheel assembly of claim 1, wherein a diameter of the wheel is less than 10 cm.

3. The wheel assembly of claim 2, wherein the diameter is less than 5 cm.

4. The wheel assembly of claim 1, wherein the first body comprises a hole formed at a first end of the first body.

5. The wheel assembly of claim 4, wherein the wheel assembly is coupled with a wheel holder that is configured to be fixed to a luggage container.

6. The wheel assembly of claim 5, wherein the wheel assembly is coupled with the wheel holder via a fastening means or connection rod that passes through a hole formed at the wheel holder, the fastening means or connection rod inserted into the hole of the first body.

7. The wheel assembly of claim 4, wherein the first body is divided into two separated lugs at a second end that is at an opposite side of the first end, the lugs extending from two side portions of the second end.

8. The wheel assembly of claim 7, wherein the second body is coupled with the first body by having a first end portion of the second body between the lugs of the first body.

9. The wheel assembly of claim 8, wherein:
each of the lugs has a hole or a through hole and the second body has a corresponding through hole formed at the first end portion of the second body;
the second pivot pin fastens the first end portion of the second body between the lugs; and
the second body is rotatable about the second pivot pin.

10. The wheel assembly of claim 9, wherein a size of the holes or through holes of the lugs is smaller than a size of the corresponding through hole of the second body, thus allowing movement of the second body toward the second end of the first body.

11. The wheel assembly of claim 8, wherein a bottom of the second end of the first body is recessed and a first protrusion protrudes from the recessed area of the bottom.

12. The wheel assembly of claim 11, wherein:
a second protrusion that corresponds to the first protrusion is formed at the first end portion of the second body;
the first protrusion is inserted into a first end of a second coiled spring and the second protrusion is inserted into a second end of the second coiled spring; and
a distance between the first protrusion and the second protrusion decreases when the second coiled spring is compressed by movement of the second body toward the second end of the first body.

13. A wheel assembly comprising:
a first body having a first end portion and a second end portion;
a second body having a third end portion and a fourth end portion at which a through hole is formed, the third end portion of the second body rotatably coupled to the second end portion of the first body via a first pivot pin;
a wheel rotatably coupled to the second body via a second pivot pin;
a rod having a fifth end portion and a sixth end portion at which a hole is formed, the fifth end portion coupled with the first body via a third pivot pin;
a first coiled spring having a first end contacting the first body and a second end contacting the third end portion of the second body; and
a second coiled spring having a third end, the rod inserted into the second coiled spring via the third end, and a fourth end contacting the fourth end portion of the second body,
wherein:
an angle between the first body and the second body changes according to movement of the second body with respect to the first body, the angle decreased when at least one of the first coiled spring or the second coiled spring is compressed;
a fastening means passing through the through hole of the second body and inserted into the hole of the rod; and
a portion of the fastening means, which is located within the second coiled spring, is exposed between the hole of the rod and the through hole of the second body.

14. The wheel assembly of claim 13, wherein the first coiled spring is smaller than the second coiled spring.

15. The wheel assembly of claim 14, wherein:
the first body has a first protrusion that is inserted into the first end of the first coiled spring; and
the second body has a second protrusion that is inserted into the second end of the first coiled spring.

16. A luggage container comprising:
a wheel holder coupled to a side of the luggage container; and
a wheel assembly coupled to the wheel holder,
wherein the wheel assembly comprises:
a first body having a first end portion and a second end portion;
a second body having a third end portion and a fourth end portion at which a through hole is formed, the third end portion of the second body rotatably coupled to the second end portion of the first body via a first pivot pin;

a wheel rotatably coupled to the second body via a second pivot pin;

a rod having a fifth end portion and a sixth end portion at which a hole is formed, the fifth end portion coupled with the first body via a third pivot pin;

a first coiled spring having a first end contacting the first body and a second end contacting the third end portion of the second body; and a second coiled spring having a third end, the rod inserted into the second coiled spring via the third end, and a fourth end contacting the fourth end portion of the second body, wherein:

an angle between the first body and the second body changes according to movement of the second body with respect to the first body, the angle decreased when at least one of the first coiled spring or the second coiled spring is compressed;

a fastening means passing through the through hole of the second body and inserted into the hole of the rod; and a portion of the fastening means, which is located within the second coiled spring, is exposed between the hole of the rod and the through hole of the second body.

\* \* \* \* \*